United States Patent Office 2,906,622
Patented Sept. 29, 1959

2,906,622

PRODUCTION OF GROWTH STIMULATING AGENTS

James C. Lewis, Berkeley, Calif., assignor to the United States of America as represented by the Secretary of Agriculture No Drawing. Application April 16, 1954
Serial No. 423,859

10 Claims. (Cl. 99—9)

(Granted under Title 35, U.S. Code (1952), sec. 266)

A non-exclusive irrevocable, royalty-free license in the invention herein described, for all governmental purposes, throughout the world, with the power to grant sublicenses for such purposes, is hereby granted to the Government of the United States of America.

This invention relates to the production of nutritional factors, that is, substances which have growth promoting properties and which are particularly useful for stimulating the growth of chicks and other animals. The invention also concerns the preparation of animal feeds supplemented with such nutritional factors. Further objects and advantages of the invention will be obvious from the description herein.

During the past three decades many individual substances have been found to be essential to the normal growth and wellbeing of animals. Some of these have been identified and even synthesized by chemical or microbiological techniques. The nature of others is still in doubt. A variety of experiments has shown that chick growth may be stimulated by unidentified substances in fish solubles, whey, grass juice, and possibly other materials. It has also been shown in recent years that numerous anti-microbial agents stimulate the growth rate, improve the efficiency of utilization of feed, and lower the mortality of chicks, turkey poults, growing pigs, and other animals. Substances that have been found to be useful in one or more of the above-mentioned applications include some of the sulfa drugs, some of the arsonic acids, and some of the antibiotics including penicillin, chlortetracycline ("Aureomycin") oxytetracycline ("Terramycin"), and bacitracin. The mode of action of these substances is not well understood but it is thought that they may cause enhanced synthesis of known or unknown essential nutritional factors by intestinal microorganisms, inhibition of toxin- or disease-producing microorganisms of the digestive tract, or inhibition of intestinal microorganisms which compete with the host animal for essential nutrients.

It has now been found that certain strains of the species *Bacillus subtilis* have the ability to biosynthesize nutritional factors useful for stimulating the growth of chicks and other animals. Thus cultures of these microorganisms, or concentrated preparations thereof, when fed to animals give growth responses which cannot be attributed to any of the known growth factors or to antibiotics which have been described previously and which have been recognized to be nutritionally active. It is not yet known whether the individual strains elaborate similar or different nutritive factors. Also it is not known as yet whether the growth stimulating properties of these strains are due to their antibiotic constituents or constituents of a vitamin character such as the unknown nutritive factors in fish solubles, whey, grass juice, etc. Regardless of the nature of the growth-promoting substances, whether they ultimately prove to be of an antibiotic nature or of a vitamin nature, or unlike either of these types, the fact of the matter is that cultures or concentrates of these strains give growth responses that have practical significance as shown in the examples hereinafter.

The organisms used in applying this invention are two strains of *Bacillus subtilis* which are described as follows: One of the strains is that described as No. 231 by Smith, Gordon, and Clark (Aerobic Sporeforming Bacteria, Dept. of Agriculture Monograph #16, November 1952, page 74). This strain is also on deposit in the culture collection of the Northern Regional Research Laboratory, Peoria, Ill., as NRRL B–543, and in the American Type Culture Collection, Washington, D.C., as ATCC 6633. This strain will be referred to herein by the latter designation. The other strain of *B. subtilis* is on deposit at the Northern Regional Research Laboratory as NRRL B–1467. Both the ATCC 6633 strain and the NRRL B-1467 strain produce subtilin and exhibit the same antibiotic patterns. On the basis of these and other observations it is believed that the two strains are very closely related and may even be identical.

Although the above-described strains of *B. subtilis* produce subtilin, the growth stimulating value of cultures of the organisms is not due solely to the subtilin present therein. Thus it has been found that cultures of the selected strains give growth responses over and above that expected by their subtilin contents. The experimental data indicate that the cultures contain growth stimulating agents which cannot be identified with subtilin and that these agents are responsible for the very high potency of the cultures in regard to promoting the growth of chicks and other animals. In techniques wherein subtilin is isolated from cultures of *B. subtilis* and added to feeds these unidentified but potent growth-stimulating factors are discarded in the isolation procedure. In applying this invention, the cultures are so treated that the unidentified growth factors are not discarded or destroyed but are present in the product which is used as a feed supplement. As a result the products of this invention give a higher degree of growth stimulation than can be obtained by supplementing the feed with subtilin, per se.

In applying this invention either one of the disclosed strains of *B. subtilis* is cultured on a nutrient medium. Preferably the culturing is carried out under aerobic, agitated, submerged conditions in a nutrient liquid medium. For animal feeding purposes, the culture itself can be added to conventional feeds to provide the growth stimulating factors. Preferably, the culture is concentrated to provide a more highly potent preparation. This concentration may involve evaporating part of the water from the culture to make a syrup, or evaporating essentially all the water from the culture to produce a dry, solid product. Further, special fractionation procedures may be applied to the culture to eliminate water and/or nutritionally-inert solids. The amount of the growth factor containing preparation to be added to animal feeds will vary widely depending, for instance, on the potency of the particular preparation (that is, whether it is a whole culture or is concentrated or dried) and on the degree of growth stimulation desired for the supplemented feed. In general the proportion of the growth factor preparations will be small because of their high physiological activity. Thus, for example, concentrations of as little as 0.025% of dried whole culture in the ration have given desirable growth stimulation in chicks.

As noted above, the growth of the designated strains of *B. subtilis* is preferably carried out in a liquid medium under aerated, agitated and submerged conditions as giving the highest yields together with efficiency and economy of operation. In carrying out such cultures, the sterilized liquid medium is placed in a fermentation vessel, inoculated with the selected strain of *B. subtilis* and then air is continuously forced into the inoculated medium while it is subjected to agitation. Under such conditions the cells are dispersed throughout the medium and are kept in intimate contact with the air and with the nutrients present in the medium. As a result growth of the microorganism proceeds rapidly and the nutrients are utilized efficiently.

The cultures of B. subtilis are generally stored in nutrient agar slants. For preparing inoculum for submerged culture, transplants are usually made into shallow layers of experimental media in Erlenmeyer flasks and incubated at 25° C. to 35° C. for 48 hours using a shake technique. The contents of the flasks are then thoroughly agitated and 50–100 ml. of the resulting suspension used to inoculate 1 liter of culture medium. The inoculum can also be prepared on a small scale under submerged conditions according to the process herein disclosed. High yields of the growth factors in the shortest time can be produced if the inoculum is grown under submerged conditions on the same medium as intended to be used in the larger-scale submerged culture and the inoculation is carried out at the time when cell production is at a maximum rate in the inoculum culture.

In carrying out the process of this invention under the preferred technique of submerged conditions, many types of apparatus can be used. The essentials to be provided are a vessel equipped with stirring device and means for introducing air during the run and means for cooling or heating the contents of the vessel. Many refinements may be added such as thermometers, sampling devices, inlets for introducing materials, mechanical foam breakers, and so forth. It is preferable to employ some stirring or agitating device to disperse the air entering the system with the medium. Such device may be a mechanical agitator, for example. Further, it is possible to utilize the air entering the system for agitation as well as for the metabolism or the organism. For this purpose air may be introduced through orifices whereby turbulence of the culture will be obtained. Another method of providing agitation is to continuously circulate the culture medium through a pump. In such case the air may be introduced directly into the pump or into the pump line whereby it will be thoroughly dispersed with the culture medium.

During submerged culture excessive foaming is sometimes encountered. This can be controlled by adding a chemical de-foaming agent or by mechanical devices. Commercial de-foaming agents suitable for this purpose are available on the market. A suitable example is a monoglyceride dissolved in lard oil; another is octadecanol, which for convenience in adding small quantities thereof, may be diluted with purified mineral oil (liquid petrolatum) or lard oil. Mechanical foam breakers such as disclosed by Humfeld (Jour. Bacteriology, vol. 54, p. 689) may be used instead of chemical means.

In culturing the selected strains of B. subtilis by any technique, air must be available to the organism. In culturing under submerged conditions, air must be actually introduced into the culture. It is most convenient to introduce the air at the bottom of the fermentation vessel through a sparger or other mechanical device to break up the air into fine bubbles. Usually an excess of air is provided to supply air for growth and to act as an agitating means. Thus the volume of air introduced may be from about 0.1 to about 2 liters per minute per liter of medium.

In general, the culture of the microorganisms is harvested when the cell growth is at a maximum. This point can be determined by measuring the turbidity of the culture with optical instruments from time to time since increased cell concentration increases the turbidity of the liquid medium. Estimates of cell production may also be obtained by centrifuging samples of the culture at intervals. In some cases the production of the growth factors will lag somewhat behind cell production. Thus to obtain maximum yield of growth factors, the culture may be incubated several hours after maximum cell production is reached. Using media of the type herein described, production of the growth factors is at a maximum in about 10 to 24 hours.

The B. subtilis strains may be grown on many different media. In essence, the medium should provide, besides water, (1) a source of energy, (2) a source of nitrogen, and (3) suitable minerals.

The source of energy may be a carbohydrate as, for example, sucrose, dextrose, fructose, maltose, solubilized starch, dextrin, and so forth. Instead of carbohydrates, polyhydric alcohols may be used as for example, glycerol, mannitol, sorbitol, and so forth. Of course some of these energy sources are more readily utilized by the bacillus and hence higher yields of the growth factors are produced under otherwise identical conditions. Usually we prefer to use sucrose or dextrose (or materials containing them) as being relatively low in cost and yet productive of high yields. The concentration of the energy source should be enough to provide sufficient nutrient for good growth of the organism; in general, concentrations from about 5 to about 10% can be used. It is sometimes advantageous to use a lower concentration, say from 1% to 5% and add additional amounts of the energy material as the culture proceeds and the material is used up. It is not essential to use purified, individual compounds as the source of energy. Thus one may employ corn syrup, corn sugar, invert sugar, beet or cane molasses, syrups made from fruit cannery wastes, or cereal worts derived from wheat, oats, barley, malted barley, rice, etc. The cereal worts may be subjected to complete or partial saccharification with a diastatic enzyme or other hydrolytic agent to render the energy material more readily assimilable by the bacillus.

The source of nitrogen may be an organic or inorganic nitrogen derivative. In the organic category may be mentioned proteins, hydrolyzed proteins, enzyme-digested proteins, amino acids, yeast extract, asparagin, and urea. For reasons of economy it is usually preferable to employ an inorganic compound such as ammonia, ammonium hydroxide, or salts thereof such as ammonium phosphate, ammonium citrate, ammonium acetate, ammonium sulphate, ammonium nitrate and so forth. In general, the concentration of nitrogen should be from about 0.075 to 1%. No deleterious effect is caused by adding more than 1%. A very convenient method of supplying nitrogen is to add ammonium hydroxide periodically during the course of the culture. In this way the pH of the culture can be kept constant and the requisite nitrogen is supplied. For this purpose ammonia gas also can be bubbled directly into the culture.

In addition to the energy and nitrogen sources, mineral nutrients are also required for the medium. Thus potassium, sulphur and phosphorus are required. These elements may be supplied in the form of their salts. Thus the potassium may be supplied as potassium chloride, phosphate, sulphate, citrate, acetate, nitrate, and so forth. Sulphur and phosphorus are supplied in the form of sulphates or phosphates such as alkali metal or ammonium sulphates and alkali metal or ammonium phosphates. These elements, potassium, sulphur, and phosphorus, are generally added to the medium in a concentration of from about 100 to about 1,000 p.p.m. of each. (The abbreviation "p.p.m." used herein means parts per million.) In addition, the following minerals are required in trace amounts (from about 1 to about 100 p.p.m. of each): zinc, iron, manganese, magnesium, calcium, and cobalt. In preparing media from refined materials such as chemically pure sugar and ammonium salts it is essential to add these trace elements. However, where the medium is made from technical-grade materials such as beet or cane molasses, asparagus juice, worts from cereals, and so forth, then trace elements are usually already present. If trace elements are to be deliberately added to the medium one can use any suitable salt thereof such as the chlorides, sulphates, nitrates, and so forth.

The addition of citric acid or other organic acid (or water-soluble salt thereof such as the alkali metal or ammonium salt) to the medium is often beneficial to act as a buffer and to keep the various salts in solution. Citric acid is especially beneficial where the concentration of iron, magnesium, calcium, or phosphorus is too high due, for example, to impurities in the materials used. Thus an addition of from about 0.05% to about 0.5% citric acid gives good results. Instead of using purified citric or other organic acid one can use materials containing the same or similar acids such as asparagus juice, alfalfa juice, beet molasses, Steffen's waste liquor and other agricultural materials of this type.

The pH of the culture may vary from about 5.5 to about 7.5. If the pH is not controlled during the fermentation, the pH will drop as the organism reproduces. Hence it is preferable to keep the pH within the stated range during the entire run. This can be accomplished by using a buffer. For example, phosphoric acid, citric acid, or other weak organic acid may be added to the culture either as such or in the form of their water-soluble salts, i.e., their sodium, potassium, or ammonium salts. Another method of controlling the pH is to add an alkaline material in small portions as the run proceeds. For this purpose one may use the hydroxides of sodium, potassium, or ammonium, or ammonia gas. As set forth above, ammonium hydroxide or ammonia are preferred for this purpose as they not only serve to regulate the pH but are also nutrients for the organism.

The temperature of the culture can be varied from about 25° C. to about 40° C. Since the rate of growth of the organism increased as the temperature is raised, it is preferred to use a temperature from about 35° C. to about 40° C. In maintaining proper temperature levels it is usually necessary to heat the system during early stages of growth whereas as the culture proceeds it will be observed that heat is generated in the culture and hence cooling will be required to keep the culture at the desired temperature. Thus in working up large batches it is preferred to use a vessel which is equipped with a jacket or coil into which can be introduced a heating or a cooling medium by suitable control of valves and so forth.

The growth factors can be produced in a continuous manner in the following way: A medium is prepared containing water, the mineral nutrients, citrates if necessary, and small amounts of the energy source and the nitrogen source. These latter two components are added only in sufficient quantity to enable initial growth to proceed. The media is sterilized, cooled, then inoculated and culturing started under the conditions set forth herein. Then as the growth proceeds, additional sources of energy and nitrogen are added at intervals to maintain growth of the bacillus. After a good growth of the organism is established, portions of the culture are withdrawn from time to time for use as the source of the growth factors.

As noted above, the growth stimulating factors produced in accordance with this invention can be prepared in many forms. Thus the whole cultures may be concentrated in evaporating apparatus to produce a syrup form of the product. Also the culture or concentrates thereof may be dried to the solid state by the use of such apparatus as spray driers, drum driers, tray driers, etc. To prevent heat damage to the products, it is preferred to use apparatus adapted to carry out such dehydration under vacuum whereby the temperature needed for dehydration may be lower than where atmospheric pressure prevails. A useful procedure to obtain a dry solid product involves first concentrating the culture, preferably under vacuum, to obtain a liquid concentrate containing on the order of 15 to 50% solids. This concentrate is then subjected to dehydration in a vacuum dehydrator of the tray, drum, or belt type. During the dehydration the concentrate is subjected to vacuum and to a temperature on the order of 100–250° F. The concentrate being high in solids content will tend to puff extensively during such drying operation yielding a product of porous texture and which is easy to break up into small fragments which have a free-flowing character. To assist in the expansion of the concentrate during drying, it is often desirable to add a drying aid, for example, dextrin, gelatin, pectin, sodium carboxymethyl cellulose, methyl cellulose, corn syrup solids, alginic acid, yeast, and so forth. In some cases it is advantageous to add an inert diluent such as paper pulp, rice bran, ground bagasse, ground corn cobs, ground oyster shells, etc., to prevent the product from forming a hard gummy mass during dehydration.

Instead of concentrating or dehydrating the whole cultures, they may be fractionated to eliminate inert materials and thus reduce the bulk of material which needs to be concentrated or dehydrated. Thus it has been found that when cultures of the organisms described herein are first acidified to a pH of about 2 to 3.5 by addition of sulphuric acid, hydrochloric acid or other strong acid, the precipitated material contains about 90% of the growth activity, only 10% being in the liquid phase. By centrifugation the precipitated material including the bacterial cells can be isolated from the relatively inactive supernatant. Thus the fractionation achieved by acidification of the culture and centrifugation results in a simple means of separating the active material from a gross quantity of the medium. Naturally the dehydration of the precipitated material will afford great economies as compared with dehydrating the entire culture. The precipitated material can be dehydrated for use as a supplement by the use of a drum drier or any of the techniques or equipment discussed above in connection with the dehydration of the whole cultures. The product obtained by such fractionation contains subtilin plus unidentified growth stimulating factors. A further purification can be achieved by extracting with butanol the cream obtained by centrifuging the acidified culture. The butanol extract contains subtilin plus the unidentified growth-stimulating factors and this extract can be reduced to dryness to produce a product of very high growth stimulating potency.

The following examples demonstrate the invention in greater detail. These examples are furnished by way of illustration and not limitation.

*Example I*

A sterile medium was prepared containing the following ingredients dissolved in water:

| | G./liter |
|---|---|
| Beet molasses | 85 |
| Potassium sulfate | 2 |
| Diammonium phosphate | 8.5 |
| Diammonium citrate | 19 |

In addition to the above ingredients, metal chloride salts were present in amounts to furnish the following concentration of metallic ions:

| | P.p.m. |
|---|---|
| Zn | 5 |
| Fe | 5 |
| Mg | 50 |
| Mn | 50 |
| Co | 2 |
| Ca | 20 |

Ten liters of the above medium contained in a fermentor similar to that disclosed by Humfeld et al. (U.S. Patent No. 2,542,031) was inoculated with 400 ml. of a shake culture of *B. subtilis* NRRL B-1467 grown on the same beet molasses medium.

The incubated medium was fermented at 35° C. employing constant agitation and forcing air into the medium at the rate of approximately 10 liters of air per minute. The pH of the culture was maintained at 6.3 to 7.0 by addition of ammonium hydroxide as needed. The growth of the organism was measured turbidimetrically in arbitrary units proportional to the optical density of the culture. The following log indicates the growth obtained:

| Age of culture, hrs. | Turbidity (arbitrary units) |
|---|---|
| 1 | 710 |
| 2 | 730 |
| 4 | 1,000 |
| 5 | 1,240 |
| 6 | 1,800 |
| 7 | 2,300 |
| 8 | 3,500 |
| 9 | 4,600 |

At maximum growth the amount of cellular material on a dry basis was about 25% of the sugar initially present in the medium.

After fermentation for 10 hours the entire culture was concentrated under vacuum to produce a heavy syrup. This syrup was then dried on a drum drier to produce a solid product suitable for addition to feeds as a growth supplement.

*Example II*

Feeding tests were carried out on the dried product prepared as described in Example I. For comparative purposes tests were also made of the non-supplemented basal ration and the basal ration supplemented with bacitracin and chlortetracycline (Aureomycin).

The basal ration used in these tests had the following composition:

Wheat bran _____ 5%.
Wheat middlings _____ 5%.
Dehydrated alfalfa leaf meal _____ 5%.
Soybean oil meal _____ 32%.
Steamed bone meal ____ 2%.
Ground yellow corn ____ 46.3%.
Granite grit _____ 2%.
Limestone grit _____ 2%.
Iodized salt _____ 0.5%.
Fish oil _____ 0.2%.
MnSO₄ _____ 0.025%.
Riboflavin _____ 0.15 mg. per 100 gm. ration.
Choline _____ 100 mg. per 100 gm. ration.
Vitamin B–12 _____ 3 micrograms per 100 g. ration.

The protein content was slightly in excess of 20%.

Twenty commercial hatchery run New Hampshire chicks of both sexes were placed in each 4 groups, and were fed the basal ration with the supplements indicated for 10 weeks. The weights of the chicks after 4 and 10 weeks were as follows:

| Feed supplement | Average weight of chicks in grams or percentage of controls at— | |
|---|---|---|
| | 4 weeks | 10 weeks |
| No supplement (control)_____g__ | 245 | 1,205 |
| Bacitracin, 10 p.p.m_____percent__ | 110 | 106 |
| Chlortetracycline, 10 p.p.m._____do____ | 116 | 105 |
| Product of Ex. I, 0.07%_____do____ | 106 | 107 |
| Product of Ex. I, 0.14%_____do____ | 109 | 105 |

*Example III*

The inoculum for a 2000 gallon fermentation was built up as follows:

The growth on an agar slant of the organism *B. subtilis* ATCC 6633 was washed into a Fernbach flask containing 400 ml. of sterile beet molasses medium as described in Example I. Two such flasks were incubated for 10 hrs. at 35° C. on a reciprocating shaking machine. These were used to inoculate 10 liters of beet molasses medium in a fermentor as described by Humfeld et al. (Patent No. 2,542,031). The growth period in this fermentor under aerated, agitated submerged conditions was 7 hrs. at 35° C., the packed cell volume of the culture being 5.8%. At this time the culture was used to inoculate 30 gallons of the beet molasses medium. The inoculated media was cultured as before for 6.5 hours at which time the cell volume was 10%. The resulting culture was then used to inoculate the final batch of 2000 gallons of beet molasses medium.

The fermentation was conducted under aerated, agitated submerged conditions at 35° C. The pH was maintained in the range 6.2–6.3 by addition of ammonium hydroxide solution as necessary. After the 5th hour, an additional 2000 gallons of the beet molasses medium was added to the culture. Maximum growth of 12% cell volume was reached after the 12th hour.

The whole culture was adjusted to pH 3.5 by the addition of sulphuric acid and the acidified culture centrifuged. The resulting cream, containing subtilin and unidentified growth stimulating factors, was drum dried.

*Example IV*

Feeding tests were carried out using the product of Example III as a supplement to a basal ration. The basal ration in this case was the same as in Example II except that the proportion of ground yellow corn was 43.3% and there was also present 3% of fish meal. The tests were conducted on groups of 20 commercial hatchery chicks. For comparative purposes some of the lots of chicks were fed the basal ration by itself, this ration supplemented with penicillin and this ration supplemented with subtilin which had been isolated and purified in accordance with the procedure of U.S. Patent No. 2,481,763.

The product of Example III was assayed microbiologically and found to contain only 0.09% subtilin. A sample of the product of Example III was also subjected to the subtilin isolation procedure noted above; the yield of subtilin amounted to only 0.025% in the starting material.

The results of the feeding tests are tabulated below:

| Run | Feed supplement | Subtilin content of feed | Average weight of chicks in grams or percentage of control at— | |
|---|---|---|---|---|
| | | | 4 weeks | 10 weeks |
| 1 | No supplement (control)_____g__ | None | 263 | 1,238 |
| 2 | Procaine penicillin G, 10 p.p.m. percent__ | None | 124 | 107 |
| 3 | Prod. of Ex. III, 3%_____do____ | ¹ 0.0027 | 115 | 107 |
| 4 | Prod. of Ex. III, 1%_____do____ | ¹ 0.0009 | 117 | 108 |
| 5 | Prod. of Ex. III, 0.3%_____do____ | ¹ 0.00027 | 113 | 102 |
| 6 | Subtilin, 0.03%_____do____ | 0.03 | 121 | 103 |

¹ Calculated from microbiologically assayed value of 0.09% subtilin in product of Ex. III.

It is evident from the above data that the products of Example III gave growth responses which could not be attributed solely to the presence of subtilin in the products. Thus in run 3 wherein the feed contained one tenth as much subtilin as in run 6, the weight of the chicks was higher after 10 weeks. Also in run 4 where the subtilin content of the feed was 1/33 that of the feed of run 6, the weight of the chicks after 10 weeks was higher in run 4 than in run 6. It is noted that with added subtilin in run 6 the 4 weeks' weight was high but it is to be emphasized that the weight after 10 weeks is the important criterion because the chicks are not saleable at 4 weeks whereas at 10 weeks they are marketable as broilers.

Having thus described my invention, I claim:

1. A process for preparing an animal feed which comprises incubating under aerobic conditions a nutrient medium inoculated with a strain of *Bacillus subtilis* selected from the group consisting of NRRL B–1467 and ATCC 6633, thereafter concentrating the resulting culture and admixing therewith an animal feed whereby said animal feed is enhanced with essential growth factors.

2. The process of claim 1 wherein the strain is NRRL B–1467.

3. The process of claim 1 wherein the strain is ATCC 6633.

4. An animal feed comprising a major proportion of edible vegetable material and a minor proportion of a growth promoting composition produced by incubating under aerobic conditions a nutrient medium inoculated with a strain of *Bacillus subtilis* selected from the group consisting of NRRL B–1467 and ATCC 6633, said growth promoting composition containing, in addition to subtilin, growth stimulating factors elaborated by the organism which are different from subtilin whereby said composition gives a greater degree of growth stimulation than can be accounted for on the basis of its subtilin content.

5. The animal feed of claim 4 wherein the strain is NRRL B–1467.

6. The animal feed of claim 4 wherein the strain is ATCC 6633.

7. A process of correcting the nutritive deficiency of an animal feed containing mainly edible vegetable material which comprises adding to the feed a physiologically adequate amount of a growth promoting composition produced by incubating under aerobic conditions a nutrient medium inoculated with a strain of *Bacillus subtilis* selected from the group consisting of NRRL B–1467 and ATCC 6633, said composition containing subtilin plus growth stimulating factors elaborated by the organism which are different from subtilin and which composition gives a greater degree of growth stimulation than can be accounted for on the basis of its subtilin content.

8. The process of claim 7 wherein the strain is NRRL B–1467.

9. The process of claim 7 wherein the strain is ATCC 6633.

10. A process for preparing an animal feed which comprises incubating under aerobic conditions a nutrient medium inoculated with a strain of *Bacillus subtilis* selected from the group consisting of NRRL B–1467 and ATCC 6633, acidifying the resulting whole culture to a pH of about 2 to 3.5, separating the precipitated material and evaporating moisture from the precipitated material to produce a dry, solid composition which contains subtilin plus growth stimulating factors elaborated by the organism which are different from subtilin and which composition gives a greater degree of growth stimulation than can be accounted for on the basis of its subtilin content.

References Cited in the file of this patent

UNITED STATES PATENTS

| | | |
|---|---|---|
| 2,508,378 | Feeney et al. | May 23, 1950 |
| 2,576,932 | Garibaldi et al. | Dec. 4, 1951 |
| 2,619,420 | Jukes | Nov. 25, 1952 |
| 2,626,868 | de Becze | Jan. 27, 1953 |
| 2,738,274 | Le Mense | Mar. 13, 1956 |

OTHER REFERENCES

Michener et al.: Arch. Biochem., vol. 22, June 1949, pp. 208–214.